(12) United States Patent
Noble

(10) Patent No.: US 6,626,715 B1
(45) Date of Patent: Sep. 30, 2003

(54) FILTER WRAP FOR A MARINE DIESEL ENGINE

(75) Inventor: Daniel A. Noble, Hollywood, FL (US)

(73) Assignee: Daniel Noble, Hollywood, FL (US)

( * ) Notice: Subject to any disclaimer, the term of this patent is extended or adjusted under 35 U.S.C. 154(b) by 0 days.

(21) Appl. No.: 10/198,820

(22) Filed: Jul. 22, 2002

(51) Int. Cl.$^7$ ................................................ B63H 21/32

(52) U.S. Cl. .................... 440/88 A; 123/198 E

(58) Field of Search ..................... 181/244; 440/89 R, 440/89 E, 88 A; 123/198 E, 184.21

(56) References Cited

U.S. PATENT DOCUMENTS

| 4,074,985 A | * | 2/1978 | Willas | 55/498 |
| 4,704,143 A | * | 11/1987 | Percy | 96/421 |
| 6,089,006 A | * | 7/2000 | Langford et al. | 56/202 |
| 6,430,921 B1 | * | 8/2002 | Stuart et al. | 60/309 |

* cited by examiner

*Primary Examiner*—Stephen Avila

(57) ABSTRACT

A filter wrap that wraps around an air filter of a marine diesel engine for preventing moist salt laden air from being drawn through an exhaust duct, one or more cylinders, a turbocharger and the air filter when the engine is shut down and an exhaust fan is drawing hot air out of an engine room of a large pleasure boat.

10 Claims, 1 Drawing Sheet

FILTER WRAP FOR A MARINE DIESEL ENGINE

TECHNICAL FIELD

The invention relates to marine diesel engines disposed in a large pleasure boat and more particularly to a filter wrap that wraps around the air filters on the diesel engines when the engines are shut down.

BACKGROUND ART

Large pleasure boats generally in the range of 50 to 130 feet in length are powered by diesel engines generally in the range of 800 to 2000 horsepower. Exhaust fans are installed in the engine room to remove hot air therefrom. The exhaust fans also pull salt laden damp air through the exhaust ducts, one or more cylinders of the engines, the turbochargers and through the air filter. The salt laden damp air corrodes cylinder linings, piston rings, valves, turbochargers and sequential turbocharger flapper valves. Corrosion on these engine elements results in costly replacement and engine overhauls.

DISCLOSURE OF THE INVENTION

In general, a filter wrap that wraps around an air filter on a marine diesel engine having an exhaust duct, a plurality of cylinders, and a turbocharger. Also has the engine installed in an engine room of a pleasure boat. The engine room has an exhaust fan for removing hot air from the engine room when the engine is shut down and the boat is docked. The filter wrap, when made in accordance with this invention, comprises a sheet of pliable material cut to fit over the air filter and has fasteners disposed on opposite ends of the sheet. The fasteners cooperate with the cut of the sheet to hold the sheet against the filter, to form a seal where the ends are joined and to block air flow through the filter, when the engine is shut down, preventing salt laden damp air from being drawn through the exhaust duct, at least one of the cylinders and the turbochargers by the exhaust fan. To prevent corrosion on the surfaces of the cylinder and turbocharger, when the engine is shut down.

BRIEF DESCRIPTION OF THE DRAWINGS

The invention as set forth in the claims will become more apparent by reading the following detailed description in conjunction with the accompanying drawings, wherein like reference numerals refer to like parts throughout the drawings and in which:

BEST MODE FOR CARRYING OUT THE INVENTION

Figure 1:
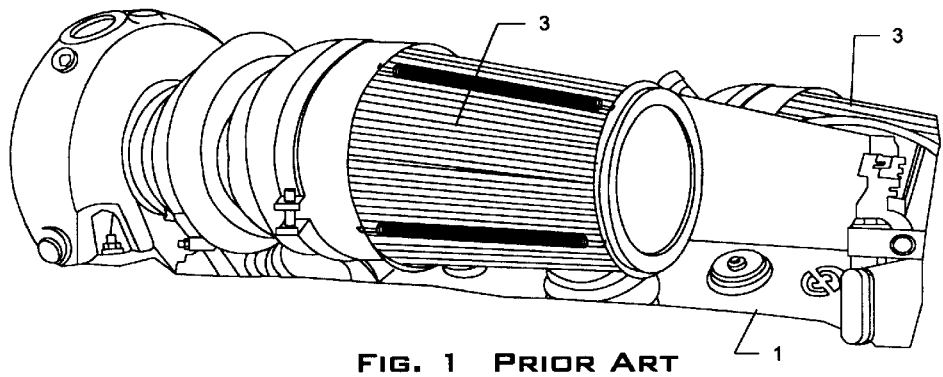
FIG. 1 is a partial side elevation of a marine diesel engine without a filter wrap.

Referring now to the drawings in detail and in particular to FIG. 1, there is shown a prior art marine diesel engine 1 with a pair of frustoconical shaped air filters 3.

Figure 2:
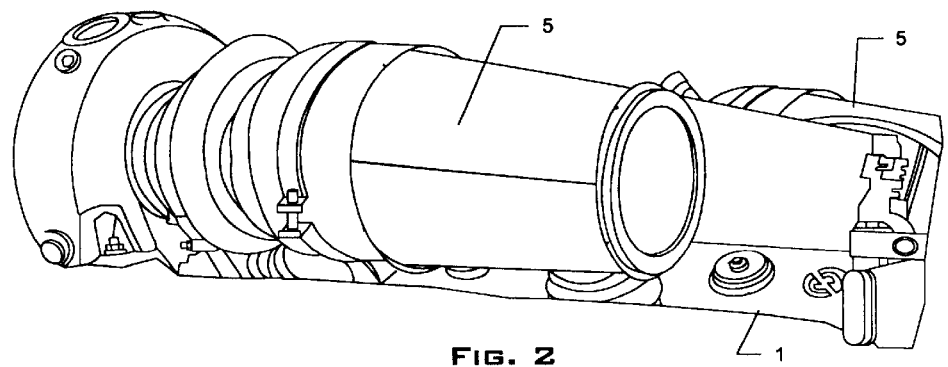
FIG. 2 is a partial side elevational view of a marine diesel with a filter wrap wrapped around the filters.

FIG. 2 shows the marine diesel engine 1 with a filter wrap 5 wrapped around each of the frustoconical shaped air filters 3 to block salt laden damp air from being pulled through the engine 1 when it is shut down and an exhaust fan (not shown) is operating to remove hot air from the engine room.

Figure 4:
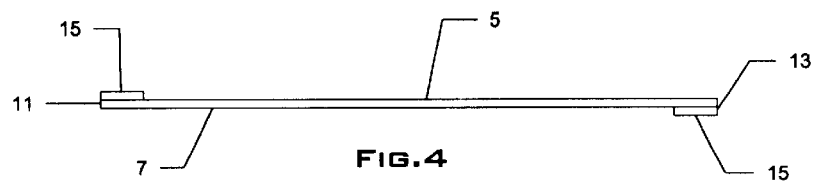
FIG. 4 is a plan view of the filter wrap.
Figure 3:
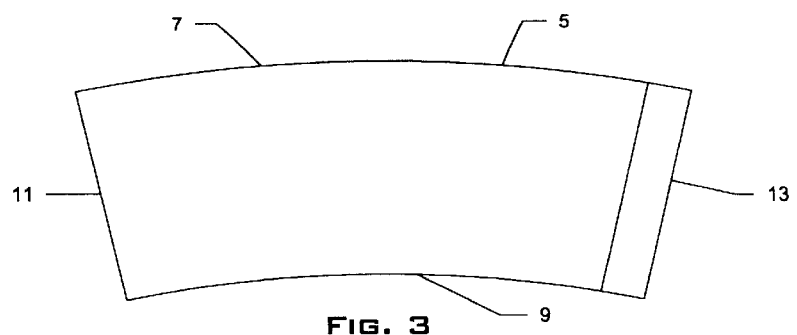
FIG. 3 is a side elevational view of the filter wrap.

FIGS. 3 and 4 show the filter wrap 5 formed from a sheet of material that will block the flow of salt laden damp air from being drawn through the engine 1 by the exhaust fan (not shown). The sheet material is pliable, durable and will block air from passing through it. Preferably the sheet material is a tight weave canvas that may, but not necessarily, be treated to enhance its air blocking property. The sheet material is cut to form the frustoconical shaped filter wrap 5, which fits over the frustoconical shaped air filter 3. To form the frustoconical shape the sheet material is cut to form two arcuate sides 7 and 9 and two straight sides 11 and 13 which taper inwardly. The length of the arcuate sides 7 and 9 are longer than the circumference of the ends frustoconical filter 3 to provide an over lap when the filter wrap 5 is wrapped around the filter 3. The length of the straight tapered sides 11 and 13 are generally equal in length or slightly longer than the slant height of the frustoconical shaped filter 3 completely covering the filter 3. Means for fastening the overlapping straight tapered sides 11 and 13 is preferably Velcro strips 15. However, zippers and snaps could also be utilized. The Velcro strips 15 are fastened to the straight tapered sides 11 and 13 adjacent the edges by sewing, adhesives of a combination thereof. The Velcro strips 15 are applied to opposite sides of the filter wrap sheet material 5. The Velcro strips 15 also compensate for any stretching or shrinking of the filter wrap 5, assuring a tight fit after repeated usage.

While the preferred embodiments described herein set forth the best mode to practice this invention presently contemplated by the inventor, numerous modifications and adaptations of this invention will be apparent to others of ordinary skill in the art. Therefore, the embodiments are to be considered as illustrative and exemplary and it is understood that the claims are intended to cover such modifications and adaptations as they are considered to be within the spirit and scope of this invention.

INDUSTRIAL APPLICABILITY

Large pleasure boats often dock in small vacation ports and a week or more of salt corrosion on the engine components can severely damage the engine. Overhauls in such cases becomes much more costly as parts and mechanics may have to be flown in. The filter wrap herein described is inexpensive and unobtrusive. The later being important because the engine rooms on such boats are normally spotless.

What is claimed is:

1. A filter wrap that wraps around an air filter on a marine diesel engine having an exhaust duct, a plurality of cylinders, and a turbocharger, the engine being installed in an engine room of a pleasure boat, the engine room having an exhaust fan for removing hot air from the engine room when the engine is shut down and the boat is docked, the filter wrap comprising a sheet of pliable material cut to fit over the air filter and having means for fastening two ends of the sheet together and are disposed on opposite ends of the sheet, the fastening means cooperating with the cut sheet to hold the sheet against the filter, to form a seal where the ends are joined and to block air flow through the filter , when the engine is shut down, preventing salt laden damp air from being drawn through the exhaust duct, at least one of the cylinders and the turbochargers by the exhaust fan and thereby, prevent corrosion on the surfaces of the cylinder and turbocharger when the engine is shut down.

2. The filter wrap as set forth in claim 1, wherein the shape of the filter is frustoconical and the sheet is cut to have two opposite arcuate sides and two straight sides that taper inwardly whereby the filter wrap wraps tightly around the frustoconical filter.

3. The filter wrap as set forth in claim 2, wherein the straight sides the sheet material over lap to form a seal.

4. The filter wrap as set forth in claim 3, wherein the fasteners are Velcro and are disposed on opposite sides of the sheet material adjacent the straight sides.

5. The filter wrap as set forth in claim 4, wherein the sheet material is a tight weave canvas.

6. The filter wrap as set forth in claim 5, wherein the canvas is treated to enhance its air blocking ability.

7. The filter wrap as set forth in claim 1, wherein the filters have a frustoconical shape and the filter wrap is cut to have a frustoconical shape.

8. The filter wrap as set forth in claim 7, wherein two opposite sides of the sheet are cut to form arcuate sides and two opposite are cut straight and tapering inwardly to form a frustoconical shape.

9. The filter wrap as set forth in claim 6, wherein the filters have a frustoconical shape and the filter wrap is cut to have a frustoconical shape.

10. The filter wrap as set forth in claim 9, wherein two opposite sides of the sheet are cut to form arcuate sides and two opposite are cut straight and tapering inwardly to form a frustoconical shape.

\* \* \* \* \*